United States Patent
Carpov et al.

(10) Patent No.: US 10,831,919 B2
(45) Date of Patent: Nov. 10, 2020

(54) METHOD FOR CONFIDENTIALLY QUERYING AN ENCRYPTED DATABASE

(71) Applicant: COMMISSARIAT A L'ENERGIE ATOMIQUE ET AUX ENERGIES ALTERNATIVES, Paris (FR)

(72) Inventors: Sergiu Carpov, Massy (FR); Renaud Sirdey, Cernay-la-Ville (FR); Simon Fau, Bagneux (FR); Oana Stan, Massy (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 193 days.

(21) Appl. No.: 15/767,885

(22) PCT Filed: Oct. 12, 2016

(86) PCT No.: PCT/EP2016/074386
§ 371 (c)(1),
(2) Date: Apr. 12, 2018

(87) PCT Pub. No.: WO2017/064085
PCT Pub. Date: Apr. 20, 2017

(65) Prior Publication Data
US 2018/0300497 A1    Oct. 18, 2018

(30) Foreign Application Priority Data
Oct. 14, 2015 (FR) ...................... 15 59774

(51) Int. Cl.
H04L 9/00       (2006.01)
G06F 21/62      (2013.01)

(52) U.S. Cl.
CPC .......... *G06F 21/6227* (2013.01); *H04L 9/008* (2013.01)

(58) Field of Classification Search
CPC .................................................. G06F 21/6227
See application file for complete search history.

(56) References Cited

U.S. PATENT DOCUMENTS

2008/0183656 A1* 7/2008 Perng .................. G06F 21/6245
2013/0170640 A1* 7/2013 Gentry .................... H04L 9/008
                                                                        380/30

(Continued)

OTHER PUBLICATIONS

U.S. Appl. No. 15/756,623, filed Mar. 1, 2018, Renaud Sirdey et al.

(Continued)

*Primary Examiner* — Josnel Jeudy
(74) *Attorney, Agent, or Firm* — Oblon, McClelland, Maier & Neustadt, L.L.P.

(57) ABSTRACT

A method for confidentially querying an encrypted database hosted by a server. The user transmits, to the server, a request including a predicate. The predicate is evaluated in an encrypted manner on different records of the database. The records that satisfy the query are transferred blindly into a container. The container is transmitted to the user who decrypts the content of same. If the container is full, the user sends a continuation request to the server. If this is not the case, the records of the successive containers that have already been decrypted form the response to the request.

10 Claims, 3 Drawing Sheets

(56) References Cited

U.S. PATENT DOCUMENTS

| | | | |
|---|---|---|---|
| 2014/0201524 A1* | 7/2014 | Dittrich | G06F 21/45 |
| | | | 713/165 |
| 2016/0283728 A1* | 9/2016 | Antonopoulos | G06F 21/6227 |
| 2018/0013549 A1* | 1/2018 | Block | H04L 9/0894 |
| 2018/0183571 A1* | 6/2018 | Gajek | H04L 9/008 |
| 2018/0191506 A1* | 7/2018 | Vilvovsky | H04L 9/0894 |
| 2019/0138739 A1* | 5/2019 | Hu | G06F 21/76 |

OTHER PUBLICATIONS

International Search Report dated Jan. 17, 2017 in PCT/EP2016/074386 filed Oct. 12, 2016.

Preliminary French Search Report dated Jun. 24, 2016 in French Application 1559774 filed Oct. 14, 2015.

Wang, S. et al., "Is Homomorphic Encryption the Holy Grail for Database Queries on Encrypted Data?", Technical report, University of California, Santa Barbara, 2012, 18 total pages.

Mani, M. et al., "Enabling Secure Database as a Service using Fully Homomorphic Encryption: Challenges and Opportunities", ArXiv, Feb. 13, 2013, pp. 1-13.

Brakerski, Z. et al., "Fully Homomorphic Encryption without Bootstrapping", Proc. of ITCS, 2012, 27 total pages.

Setty, S. et al., "Taking proof-based verified computation a few steps closer to practicality (extended version)", International Association for Cryptologic Research, Feb. 28, 2013, pp. 1-25, XP061007148.

Canteaut, A. et al., "How to Compress Homomorphic Ciphertexts", International Association for Cryptologic Research, Feb. 24, 2015, pp. 1-25, XP061017866.

Cash, D. et al., "Highly-Scalable Searchable Symmetric Encryption with Support for Boolean Queries", International Association for Cryptologic Research, Aug. 16, 2013, XP061008014.

* cited by examiner

METHOD FOR CONFIDENTIALLY QUERYING AN ENCRYPTED DATABASE

TECHNICAL FIELD

The present invention relates to the field of confidential querying an encrypted database. The invention uses the fully homomorphic encryption or FHE (full homomorphic encryption) or the partially homomorphic encryption or SWHE (somewhat homomorphic encryption). It applies more particularly to a cloud computing environment.

PRIOR ART

The recent development of cloud computing has enabled many companies to outsource their databases to data centres. However this new practice, if it reduces heavy investment in computer equipment, is not without posing serious privacy issues, as data stored in the database and content search queries. In most industries, including the medical, financial or economic, it is essential that the confidentiality of data and content queries can be guaranteed not only vis-à-vis a malicious third party but also vis-à-vis the cloud service provider itself.

To meet this requirement of confidentiality, we are naturally led to perform encryption or all of the user data stored in the database. However a simple encryption is insufficient in practice since the search for records that meet a user request reveals the locations where they are stored. A malicious third or supplier itself, can then associate the encrypted records to user queries and deduce confidential information.

The article by S. Wang et al. entitled "Is homomorphic encryption the Holy Grail for data base queries on encrypted data?" Technical report, University of California, Santa Barbara in 2012, offers a confidential inquiry method of a database whose records are encrypted using a fully homomorphic cryptosystem.

It is first recalled that a fully homomorphic encryption or FHE (full homomorphic cryptography) is an asymmetric encryption $Enc_{pk}$ (public key pk) satisfies the following relationships:

$$Enc_{pk}: X \rightarrow Y$$

$$\forall a,b \in X, Enc_{pk}(a+b) = Enc_{pk}(a) \oplus Enc_{pk}(b) \quad (1\text{-}1)$$

$$\forall a,b \in X, Enc_{pk}(a \cdot b) = Enc_{pk}(a) \otimes Enc_{pk}(b) \quad (1\text{-}2)$$

where X is the space of clear messages (called simply clear space) and Y is the space of encrypted messages (called simply space encrypted), + and are respectively an additive and a multiplicative operation in space clear giving X a ring structure (X, +, ·), $\oplus$ and $\otimes$ are corresponding operations in space encrypted giving a structure of (Y, $\oplus$, $\otimes$). It is understood from the expressions (1-1) and (1-2) that the application $Enc_{pk}$ of (X, +, ·) in (Y, $\oplus$, $\otimes$) is a ring homomorphism.

In practice, a fully homomorphic encryption is a probabilistic encryption, that is to say, depending on a random parameter (or noise) r. Encrypting a clear message m can thus give different messages encrypted $Enc_{pk}(m,r)$ according to the value taken by the parameter r. However, regardless of the value taken by this parameter, the decryption of $Enc_{pk}(m,r)$ always gives the clear message m. If we denote $Dec_{sk}$ the decryption function corresponding to $Enc_{pk}$ (where sk is the secret key of the user), we therefore have:

$$Dec_{sk}(Enc_{pk}(m,r)) = m \quad (2)$$

In the following, we adopt a simpler notation to ease the presentation, i.e. $\overline{m} = Enc_{pk}(m,r)$ and it should be omitted in the encryption/decryption expressions mention of public and private keys. Thus, it was a $Dec(\overline{m}) = m$.

A cryptosystem is defined by a pair of an encryption function Enc(.) and a decryption function Dec(.). Thus, a completely homomorphic cryptosystem, verifies the above notations:

$$Dec[\overline{a} \oplus \overline{b}] = a+b \quad (3\text{-}1)$$

$$Dec[\overline{a} \otimes \overline{b}] = a \cdot b \quad (3\text{-}2)$$

In other words, a fully homomorphic encryption is used to calculate any combination of addition and multiplication operations on plain messages from corresponding operations on encrypted messages. Generally, the space of plaintext is the field of Boolean bodies X=Z/2Z, the additive operation is an exclusive OR and a multiplicative AND operation. It is then possible to perform logical operations on Boolean values from corresponding operations on their numerical values.

Note that when the encryption method is used to calculate the combinations of addition and multiplication operations on clears with a certain depth of combination, it is preferred to use the term "partially homomorphic".

The article by S. Wang cited proposes calculating an encrypted Boolean for each record in the database, this Boolean indicating whether the record in question satisfied or not at the request of the user. The server does not know the number of records satisfying the query, the user provides it an upper bound M', the number of records that can be returned to him, as well as a result of quality parameter γ. The server uses a fixed size buffer B proportional to γM' wherein it stores records, each record of the buffer being stored randomly among γ positions of the buffer. A record that does not meet the request is stored as a null numerical value ($\overline{0}$) and therefore has no influence on decryption. However, a record corresponding to the request is stored and can be decrypted if it does not collide with another record. This probabilistic approach is however not entirely satisfactory since the server response may not be exhaustive, the degree of completeness depending on the quality parameter γ.

To remedy this lack of completeness, the M. Mani et al. article entitled "Enabling secure database as a service using fully homomorphic properties: challenges and opportunities" published in arXiv preprint, 13 Feb. 2013, pp. 1-13 proposes calculating an encrypted Boolean for each record in the database, as above, and then to proceed in two steps. Initially, the service provider server determines the number $\overline{M}$ of records corresponding to the query (number of "hits") by summing the encrypted Booleans, and transmits it to the user. The latter decrypts the number and requests the server to transmit M'>M first records. The number M' is transmitted in plaintext. The server then orders as confidential records according to the values quantified Boolean, i.e. M' first records of the table and ordered contain M satisfying records to the query. This method allows to hide the number M of records corresponding to the result.

This method of confidential querying preserves confidentiality of results but has the disadvantage of requiring a schedule of the whole database for each request.

The object of the present invention is therefore to provide a confidential querying method of a database encrypted by encryption homomorphic totally or partially homomorphic, which overcomes all or part of the aforementioned drawbacks, in particular having a high degree privacy without significant increase in computational complexity.

PRESENTATION OF THE INVENTION

The present invention is defined by a method of confidential querying a database hosted by a server, records the database containing a table, each record being obtained by means of a homomorphic encryption totally or partially of homomorphic clear values, in which:

(a) the user sends a request (R), comprising a predicate to the server;

(b) the server calculates the encrypted Boolean predicate for each record in the table;

(c) the server constructs a container ($B_m$) comprising a predetermined number (K) of locations and stores blind to said locations of records satisfying the predicate and not previously transmitted to the user, based on the Boolean values encrypted ($\bar{r}_i$, i=1, ..., N) obtained in step (b);

(d) the server transmits to the user the container thus constructed;

(e) the user receives the container, decrypts the contents of each location, and determines whether the container is full or not;

(f1) if the container is full, the user transmits a continuation request ($RC_m$) to the server for a new iteration of steps (c), (d) and (e);

(f2) if the container is not full, the user gets the response to said query from the records stored in the containers received and decrypted in step(s) (e).

The table of records is advantageously represented by a matrix $\bar{T}$ with a size of N×P where N is the number of records in the table and P the number of fields of these records, an encrypted element $\bar{A}$ of the matrix being obtained from the plaintext value $$A = \sum_{q=0}^{Q-1} a_q 2^q \text{ by } \bar{A} \equiv \bar{a}_0, \bar{a}_1, \ldots, \bar{a}_{Q-1}$$

wherein $a_q$, q=0, ..., Q−1 are the plaintext value bits and $\bar{a}_q$, q=0, ..., Q−1 are their corresponding encrypted obtained by said totally or partially homomorphic encryption.

The predicate is evaluated on various records, typically by means of additive ⊕ and multiplicative ⊗ operations on the encrypted elements.

The container is advantageously represented by a matrix $\bar{B}$ with a size of K×P with K<N, the server constructing the matrix $\bar{B}$ by initializing the elements of the null matrix and by updating the rows of this iteratively array by scanning all the records in the table of records, said updating being effected by means of an assignment operation:

$$\bar{B} = \text{Aff\_row}(\bar{B}, \bar{c} \otimes \bar{t}_i; \bar{k})$$

indiscriminately affecting the $\bar{c} \otimes \bar{t}_i$ vector at the $k^{th}$ row of $\bar{B}$, where $\bar{t}_i$ is a row-vector of $\bar{T}$ representing a $i^{th}$ scanned record and $\bar{c}$ is an encrypted Boolean.

The assignment operation of a vector T of encrypted element P with the $k^{th}$ row of a matrix $\bar{H}=(\bar{h}_{ij})$ of encrypted elements with a size of K×P gives a matrix $\bar{G}=(\bar{g}_{ij})$ of encrypted elements of the same size, such as $\text{Dec}(\bar{g}_{ij})=\text{Dec}(\bar{h}_{ij})$ ∀i≠k and $\text{Dec}(\bar{g}_{kj})=\text{Dec}(\bar{u}_j)$, 1≤j≤P.

The encrypted Boolean can be calculated by $\bar{c} = \bar{r}_i \otimes (\overline{n_{last}} < \overline{i_{dx}}) \otimes (\overline{i_{dx}} \leq \overline{n_{last}+K})$ where $\bar{r}_i$ is the encrypted value of Boolean predicate for the $i^{th}$ scanned record, $\overline{i_{dx}}$ an encrypted variable giving the number of records already scanned satisfying the predicate, $n_{last}=(m-1)K$ where m−1 is the container number previously transmitted by the server to the user and $\overline{n_{last}}$, $\overline{n_{last}+K}$ of the respective encryptions of $n_{last}$ and $n_{last}+K$.

The encrypted variable $\overline{i_{dx}}$ is advantageously updated with each record scanned by $\overline{i_{dx}} = \overline{i_{dx}} + \bar{r}_i$.

The encrypted index $\bar{k}$ of the row of the matrix $\bar{B}$ is itself updated with each record scanned by $\bar{k} = \bar{k} + \bar{c}$.

Alternatively, the database is partitioned into portions with a size of N/L with the possible exception of a portion, steps (c), (d), (e), (f1)-(f2) being carried out in series or in parallel, on each of said base portions.

The fully homomorphic encryption method can use such a Brakerski cryptosystem.

BRIEF DESCRIPTION OF THE DRAWINGS

Other features and advantages of the invention appear on reading of a preferred embodiment of the invention with reference to the appended figures wherein.

DETAILED DESCRIPTION OF SPECIFIC EMBODIMENTS

Figure 1:
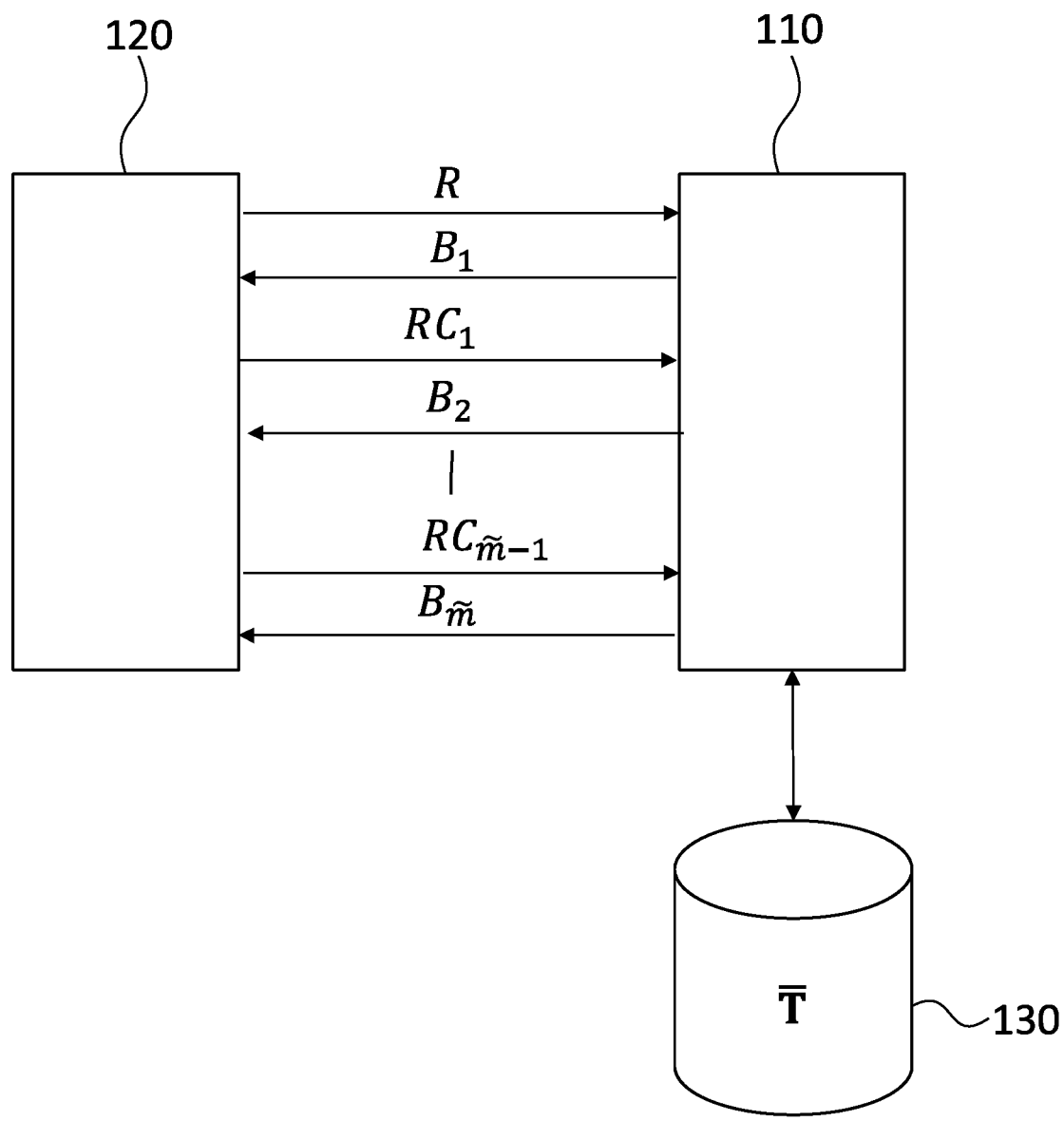
FIG. 1 schematically illustrates the implementation of a confidential querying method according to one embodiment of the invention.

The confidential querying a database encrypted by encryption totally or partially homomorphic, according to the present invention will be described below in the context of a client-server architecture illustrated in FIG. 1.

Without loss of generality, it is assumed in the following description that the encryption method is fully homomorphic. It will be understood, in fact, that one can always choose a method for partially homomorphic encryption insofar as it can calculate combinations of operations of multiplication and addition on plaintext elements with sufficient depth.

A server is shown in 110, for example a cloud service provider. This server hosts a database 130, such as a relational database. It will be assumed in all cases that the database includes a table $\bar{T}$ (e.g., a relationship in a relational database) consisting of N encrypted records. More specifically, each record includes fields P and each field is encrypted by means of a completely homomorphic cryptosystem as explained below. Each record can be considered a P-uple numerical values or equivalently as a vector of size P whose elements are encrypted. Similarly, the table $\bar{T}$ can be considered as a matrix of size N×P of encrypted elements, rows corresponding to different records and columns to different fields.

Without loss of generality, we assume in the following that the plaintext value, A, of a field can be represented by a word of Q bits, in other words:

$$A = \sum_{q=0}^{Q-1} a_q 2^q,$$

the space of the plaintext consisting of binary values {0,1}, in other words X=Z/2Z. Each bit $a_q$ is encrypted using the aforementioned completely homomorphic cryptosystem, e.g. the Brakerski cryptosystem of which a description is found in the article by Z. Brakerski et al. entitled "(Leveled) fully homomorphic encryption without bootstrapping" published in Proc. of ITCS 2012, pp. 309-325. The encrypted value $\overline{a_q}=Enc(a_q)$ is a binary word and it is noted $\overline{A}$ the sequence of words $\overline{a_q}$, q=0, . . . , Q−1, in other words:

$$\overline{A}=\overline{a_0},\overline{a_1},\ldots,\overline{a_{Q-1}} \quad (4)$$

$\overline{A}$ will be called, in a stretch of the meaning of the term, "encrypted" of A.

Similarly, is reciprocally noted $Dec(\overline{A})$, the word of Q bits defined by:

$$Dec(\overline{A}) = \sum_{q=0}^{Q-1} Dec(\overline{a_q})2^q \quad (5)$$

$Dec(\overline{A})$ will be called, in a stretch of the meaning of the term, "decrypted" of $\overline{A}$.

Returning to FIG. 1, a user transmits to the server a request, R, such as a SQL (Structured Query Language) query generally comprising a predicate, i.e. a logical expression involving one or more field(s) of the table T and can take, according to the records, a true or false value. The predicate may include Boolean operators AND, OR, NOT and/or comparison operators (<, ≤, >, ≥) or an equality operator (==).

The server evaluates the predicate (i.e. calculates its logical value) on the different records of the table T and forms a vector $\overline{r}$ with a size of N the elements of which are Boolean elements representing logical values thus obtained. It is essential to note that the evaluation of predicates is performed on encrypted and plaintext elements, and that the Boolean elements yielding logic values of different records are encrypted. In other words, the server cannot distinguish in the table the records corresponding to a true value and those corresponding to a false value of the predicate. Note that the server has more access to the number of results, that is to say the number of M records resulting in a true value of the predicate.

The method of confidential querying according to the invention implements a container, also known as bucket of fixed size, which may contain up to K records, by means of which the results of the query are returned to the user. Specifically, the server examines all the records in the table and transfers blindly to the container those that satisfy the query, that is, those for which the value of the predicate is true. The blind transfer is done by means of a detailed allocation operation further along. It ensures that the server (or a malicious third party making an attack on the server) cannot determine the actual records transferred into the container. The locations of the container in which a record has not been transferred contain numerical values $\overline{0}$ (conventionally indicating that the slot is empty).

The response of the user server is distributed over a number $\tilde{m}$ of containers, $B_1, \ldots, B_{\tilde{m}}$ where $\tilde{m}=\lceil M/K \rceil$ is the entire part by excess of the M/K fraction. The server can determine in advance the number $\tilde{m}$ of containers since the M number of results is not revealed to him. For each container $B_m$ received, the user decrypts the content on different locations of the container. If the user reaches a place containing only $\overline{0}$ it then knows that it has obtained all the results. Otherwise, if such a location is not detected, the user back to the server a continuation request, $RC_m$. The transfer of results is thus by passage of containers (or buckets) on user request. In the end, the server indirectly knows the number of containers transferred to a query, i.e. the value $\tilde{m}$ but only knows the number of results within a number K−1 of records.

There is shown in the figure, the initial request R to the user and its successive continuation requests $RC_m$, m=1, . . . , $\tilde{m}$−1. In response to requests R, $RC_1$, . . . , $RC_{\tilde{m}-1}$ the server transmits respectively the containers $B_m$, m=1, . . . , $\tilde{m}$, as explained below.

In response to the request R to the user, the server evaluates the predicate on all the records of the table T. This assessment is of course done on encrypted values. For example, if the request is to obtain all the records such as the content F a field is equal to a given numerical value $\overline{D}$, i.e. if the predicate is $\overline{F}=\overline{D}$, where $\overline{f_{Q-1}} \ldots \overline{f_1}\overline{f_0}$ and $\overline{d_{Q-1}} \ldots \overline{d_1}\overline{d_0}$ are the respective binary representations of F and D, therefore:

$$(\overline{F}=\overline{D}) = \bigotimes_{q=0}^{Q-1}(\overline{1} \oplus \overline{f_q} \oplus \overline{d_q}) \quad (6)$$

In other words, the evaluation of the predicate $(\overline{F}==\overline{D})$ gives an encrypted Boolean value of $\overline{1}$ (logic value TRUE) if the field F of the record is equal to $\overline{D}$ and equal to $\overline{0}$ (logic value FALSE) otherwise.

Other predicates implementing comparison operators and/or arithmetic operators ($\oplus$ and $\otimes$) may be used. In general, the logic of a predicate value can be obtained from $\oplus$ and $\otimes$ operations on the encrypted elements of a record. For example, we found the calculation of a comparison predicate in the aforementioned article by M. Mani et al.

In any case, the server evaluates the predicate on each record i=1, . . . , N of the table and infers a vector $\overline{r}$ with a size of N whose elements are the results of this evaluation.

Then a conditional assignment operator Sel is defined for allocating a first codeword $\overline{A}$ or a second encrypted word $\overline{B}$ at a variable $\overline{V}$ based on the value of an encrypted Boolean element $\overline{c}$, as follows:

$$\overline{V}=Sel(\overline{A},\overline{B};\overline{c})$$

$$\overline{v_q}=(\overline{c} \otimes \overline{a_q}) \oplus ((\overline{1} \oplus \overline{c}) \otimes \overline{b_q}), q=0, \ldots, Q-1 \quad (7)$$

It is understood from the expression (7) that the codeword $\overline{A}$ is assigned to $\overline{V}$ if $\overline{c}$ is a number between 1 and the codeword $\overline{B}$ is assigned to $\overline{V}$ if $\overline{c}$ is an encrypted element of 0. It is important to note that this allocation is performed blindly, that is to say that the server calculating the expression (7) has no way to determine which of the words $\overline{A}$ and $\overline{B}$ is effectively assigned to $\overline{V}$. Indeed, in the absence of the decryption key, the server does not know if $\overline{c}$ is a number from 1 or 0. In addition, the codeword assigned is changed by calculating the expression (7), n is not possible to infer the assignment of a simple comparison of $\overline{V}$ with $\overline{A}$ and $\overline{B}$.

The assignment operator Sel makes it possible to assign blindly an encrypted value to an element of a vector. Specifically, if it is noted that $\overline{v}=(\overline{v_1}, \ldots, \overline{v_P})$ an encrypted vector and $\overline{k}$ the encrypted element of an index k, 1≤k≤P, an encrypted value $\overline{u}$ can be blindly assigned to the index element k of the vector $\overline{v}$ to generate a new vector $\overline{w}=(\overline{w_1}, \ldots, \overline{w_P})$ such as:

$$Dec(\overline{w_i})=Dec(\overline{v_i}), \forall i \neq k \text{ et } Dec(\overline{w_k})=Dec(\overline{u}) \quad (8)$$

This assignment can be advantageously obtained by means of:

$$\bar{w}_i = Sel(\bar{v}_i, \bar{u}; (\bar{i}==\bar{k})), i=1, \ldots, P \quad (9)$$

As the index $\bar{k}$ is encrypted, the server performing the calculation of the expression (9) would not know which element to determine the vector $\bar{v}$ the encrypted word $\bar{u}$ would be assigned. In addition, the decryption of the elements of vector $\bar{w}$ will provide the same decrypted elements to the vector $\bar{v}$, except for the decryption of the index element k which will yield the word u. It is appropriate to note that the calculation of the expression (9) simply requires knowledge of the (public) key encryption to obtain the index numbers $\bar{i}$, i=1, ..., P.

According to the same principle, it is possible to blindly assign a codeword $\bar{u}$ to any element of indices k,l in a matrix $\bar{H}$ (with a size of K×P) of encrypted elements $\bar{H}=(\bar{h}_{ij})$, $1 \le i \le K$, $1 \le j \le P$ to obtain a matrix of the same size $\bar{G}=(\bar{g}_{ij})$, $1 \le i \le K$, $1 \le j \le P$:

$$\bar{g}_{ij} = Sel(\bar{h}_{ij}, \bar{u}; (\bar{i}==\bar{k}) \otimes (\bar{j}==\bar{l})) \quad (10)$$

The matrix $\bar{G}$ then verifies:

$$Dec(\bar{g}_{ij}) = Dec(\bar{h}_{ij}) \forall (i,j) \ne (k,l) \text{ and } Dec(\bar{g}_{kl}) = Dec(\bar{u}) \quad (11)$$

In other words, the deciphering of the elements of the matrix $\bar{G}$ will provide the same decrypted elements so that the matrix $\bar{H}$, except for the deciphering of the element of indices k,l which will yield the word $\bar{u}$. The assignment expression (10) will be noted later more concisely:

$$\bar{G} = A\!f\!f(\bar{H}, \bar{u}; (\bar{k}, \bar{l})) \quad (12)$$

The assignment may concern an entire row or entire column of matrix $\bar{H}$. For example, if $\bar{u}=(\bar{u}_1, \ldots, \bar{u}_P)$ a vector of codewords is noted to respectively assign P elements of the $k^{th}$ row of the matrix $\bar{H}$, we can define a new matrix $\bar{G}$:

$$\bar{g}_{ij} = Sel(\bar{h}_{ij}, \bar{u}_j; (\bar{i}==\bar{k})) 1 \le i \le K, 1 \le j \le P \quad (13)$$

Again, as the index $\bar{k}$ being encrypted, the processor performing the calculation of the expression (13) does not know which row of the matrix has been assigned and the decryption yields:

$$Dec(\bar{g}_{ij}) = Dec(\bar{h}_{ij}) \forall i \ne k \text{ et } Dec(\bar{g}_{kj}) = Dec(\bar{u}_j), 1 \le j \le P \quad (14)$$

In other words, the decryption of the matrix elements of $\bar{G}$ provide the same decrypted elements for the matrix $\bar{H}$, except decryption elements of the row k that will restore the elements of the vector u. The expression (14) will be noted more concisely hereinafter:

$$\bar{G} = A\!f\!f\_\text{row}(\bar{H}, \bar{u}; \bar{k}) \quad (15)$$

Figure 2:
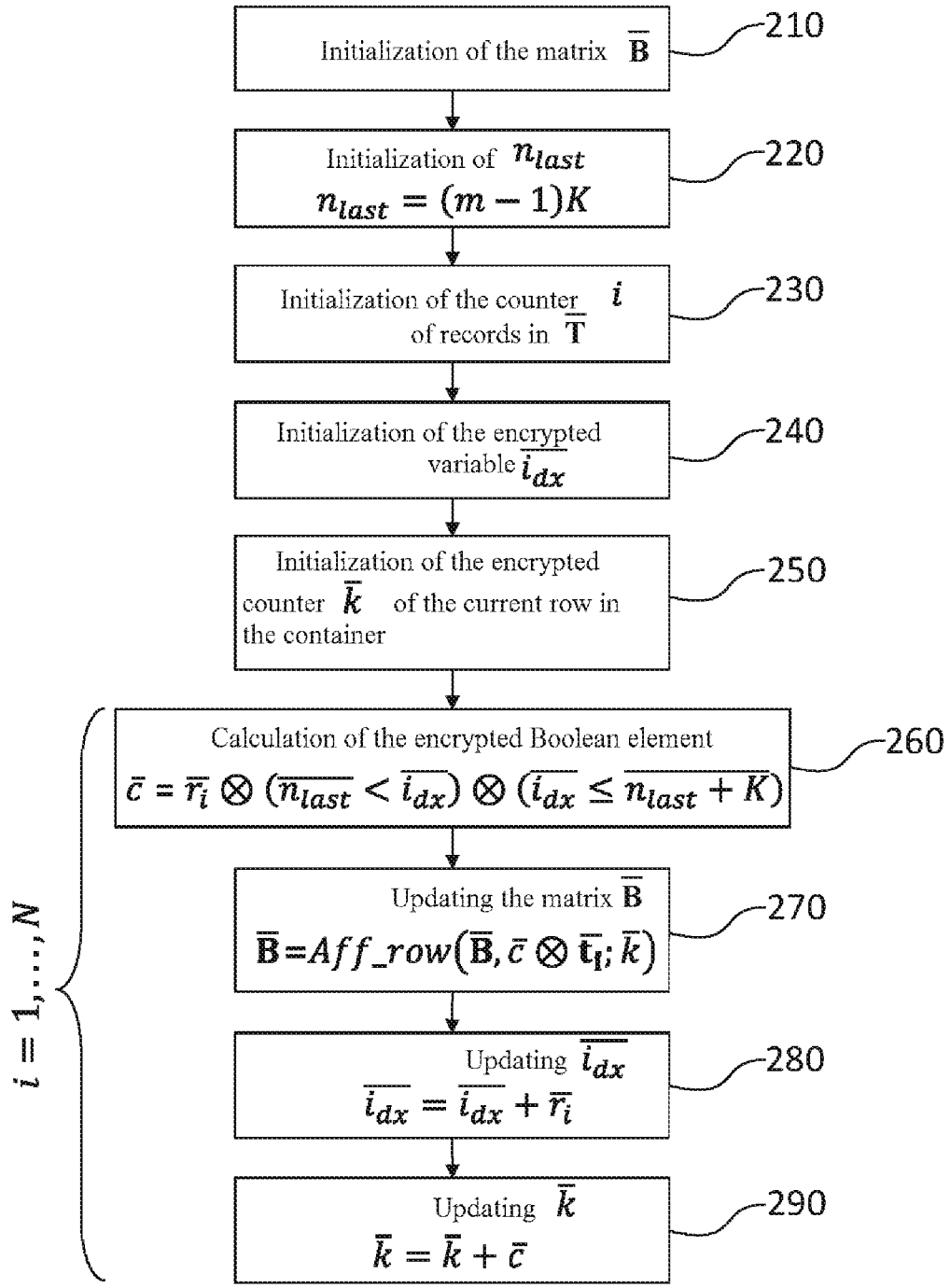
FIG. 2 shows a flow chart of the construction of containers for confidential querying method according to one embodiment of the invention.

The assignment operation Aff_row makes it possible for the server to blindly extract records satisfying the user query and load them in successive containers as explained in relation to FIG. 2.

It is assumed in this figure that the server received a continuation request $RC_m$ from the user and therefore must build the container $B_m$.

This container can be considered as a matrix B with a size of K×P. Here we recall that K is the number of records that can be stored in the container and P the number of fields. We recall that the table of records can be considered a matrix T with a size of N×P: $T=(t_{ij})$, i=1, ..., M, j=1, ..., P. It is assumed that K<N, or K<<N.

At step 210, the matrix $\bar{B}$ is initialized by the matrix $0_{K \times P}$ all the elements of which are null.

At step 220, the index $n_{last} = (m-1) \cdot K$ the index of the last record transmitted to the user is determined. The server knows indeed that it has already sent records satisfying the query to the user. It should be noted, however, that the server does not know where the last record is found in the table T.

At step 230, a record counter is initialized in the table T, i.e. 1=1. It should be noted that this counter is plaintext. It is used to scan successive records in the table.

In step 240, the server initializes a variable $\bar{i}_{dx}$ yielding the number of scanned records satisfying the predicate, i.e. $\bar{i}_{dx} = \bar{0}$. It should be noted that this variable is encrypted but its null initial value is known to the server.

At step 250, the server initializes a counter $\bar{k}$ pointing to the current row of the container, $\bar{k}=\bar{1}$. Again, the counter is encrypted but its initial value is known to the server.

All the records of the table T, are then scanned, i.e. a loop is entered into in which the steps are repeated for i going from 1 to N:

At step 260, the encrypted Boolean is calculated:

$$\bar{c} = \bar{r}_i \otimes (\overline{n_{last}} < \bar{i}_{dx}) \otimes (\bar{i}_{dx} \le \overline{n_{last}+K}) \quad (16)$$

In other words, it is determined blindly if the $i^{th}$ record in the table T satisfies the request (term $\bar{r}_i$), and if it is actually part of last the $n_{last}+1$ to $n_{last}+K$ records that can be transferred to the current container (term $(\overline{n_{last}} < \bar{i}_{dx}) \otimes (\bar{i}_{dx} \le \overline{n_{last}+K})$). This test is necessary since it scans the whole of the table blindly.

At step 270, the $i^{th}$ record is transferred of the table T to the $k^{th}$ location of the container, by updating the matrix $\bar{B}$ using the assignment operation:

$$\bar{B} = A\!f\!f\_\text{row}(\bar{B}, \bar{c} \otimes \bar{t}_i; \bar{k}) \quad (17)$$

where $\bar{t}_i$ the vector of size P is noted representing the $i^{th}$ record of the table T and where $\bar{c} \otimes \bar{t}_i$ is the vector defined by:

$$\bar{c} \otimes \bar{t}_i = (\bar{c} \otimes \bar{t}_{i1}, \ldots, \bar{c} \otimes \bar{t}_{iP}) \quad (18)$$

In step 280, the number of scanned records satisfying the query is updated, i.e.:

$$\bar{i}_{dx} = \bar{i}_{dx} + \bar{r}_i \quad (19)$$

In step 290, the row pointer in the container is updated by:

$$\bar{k} = \bar{k} + \bar{c} \quad (20)$$

In other words, the index k is only increased (in a hidden manner) to the extent that the $i^{th}$ record is both a satisfactory recording to the application and is intended to be stored in the current container.

A numerical example is given below to illustrate the process for constructing the containers. The user request R here is to retrieve all records from the base starting from byte (encrypted) $\overline{192}$.

It is assumed that the table T is composed of five records composed of four fields, namely:

| i/p | 1 | 2 | 3 | 4 | $\bar{r}_i$ | $\bar{i}_{dx}$ |
|---|---|---|---|---|---|---|
| 1 | $\overline{192}$ | $\overline{168}$ | $\overline{132}$ | $\overline{20}$ | $\bar{1}$ | $\bar{1}$ |
| 2 | $\overline{201}$ | $\overline{141}$ | $\overline{32}$ | $\bar{1}$ | $\bar{0}$ | $\bar{1}$ |
| 3 | $\overline{192}$ | $\overline{168}$ | $\overline{201}$ | $\overline{20}$ | $\bar{1}$ | $\bar{2}$ |
| 4 | $\overline{121}$ | $\overline{42}$ | $\bar{2}$ | $\overline{255}$ | $\bar{0}$ | $\bar{2}$ |
| 5 | $\overline{192}$ | $\overline{178}$ | $\overline{101}$ | $\bar{2}$ | $\bar{1}$ | $\bar{3}$ |

The first column provides the indices of the records, the penultimate contains the encrypted Boolean $\bar{r}_i$ and the last encrypted Boolean $\bar{i}_{dx}$.

It is assumed that the container size is K=2. In this case, the first container returned by the server is as follows:

| | | | |
|---|---|---|---|
| $\overline{192}$ | $\overline{168}$ | $\overline{132}$ | $\overline{20}$ |
| $\overline{192}$ | $\overline{168}$ | $\overline{201}$ | $\overline{20}$ |

Upon receipt of this container, the user decrypts the (fields of the) different records stored therein. As the user does not detect any null row, it transmits a first continuation request of the $RC_1$ server. It rescans the five records in the table and only transfers to the second container those that have not already been stored in the first. The server then constructs the second container:

| $\overline{192}$ | $\overline{178}$ | $\overline{101}$ | $\overline{2}$ |
|---|---|---|---|
| $\overline{0}$ | $\overline{0}$ | $\overline{0}$ | $\overline{0}$ |

The user decrypts the (field of the) different recordings and detects a null row, i.e. comprising only encrypted null values. It is concluded therefrom that all records satisfying the query have already been transmitted to it.

It is understood that the above described container construction method ensures that the server has access to an upper bound on the number of results ($\tilde{m}K$). The size K of the container is a compromise between the degree of ambiguity acceptable for the number of results, and the need for communication resources (between the user and the server). Indeed, a trivial solution, but without interest, would be to choose κ=N, i.e. to load the entire table $\overline{T}$ in the container. The ambiguity about the number of results would be the maximum but the number of records transmitted unnecessarily would also be a maximum (N-M). However, in a small-sized K container, the ambiguity on the number of results would be lower but the number of unnecessarily transmitted recordings would also be smaller ($\tilde{m}$-M).

It has already been pointed out hereinbefore that the construction of each container required the entire table $\overline{T}$ to be scanned. In order to simplify the calculations, we can partition the table into L portions of a size equal to N/L (except for the last portion of size N-⌊N/L⌋·L), the extraction procedure is applied to each portion of the table. The complexity of constructing a container is reduced by a factor L. In contrast, the transfer of results mobilizes at least L times more communication resources to the extent that the L table portions will be scanned at least once each. Ultimately, the choice of K container size and partition factor L is a compromise between the required degree of ambiguity, available computing resources and communications resources.

Figure 3:
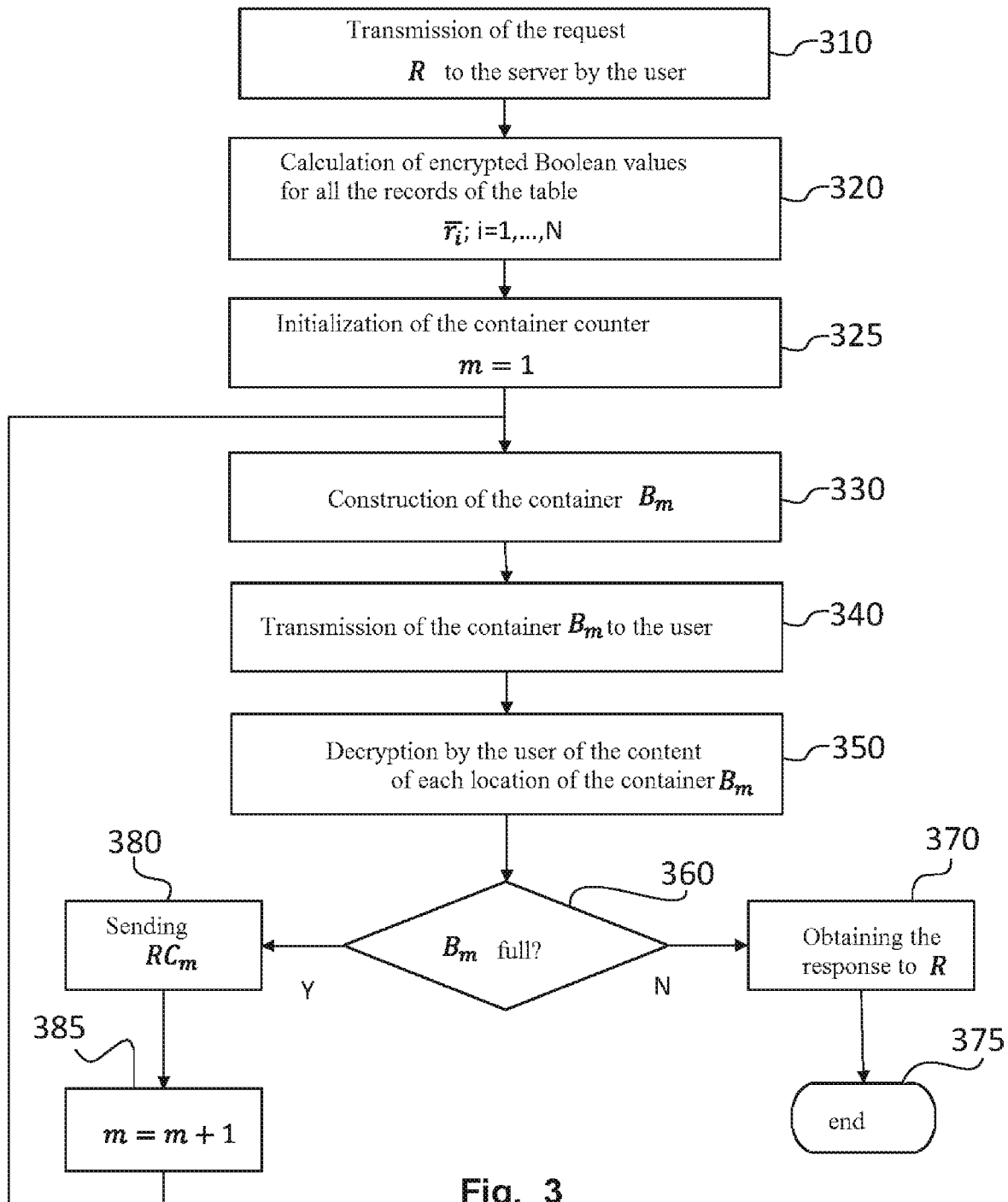
FIG. 3 schematically shows a flow chart of the confidential querying method of a database according to an embodiment of the invention.

A flowchart is schematically shown in FIG. 3 of a confidential querying method of a database according to an embodiment of the invention.

Exchanges between the user (client) and the server (service provider) are those already illustrated in FIG. 1.

At step 310, the user transmits a request (R) comprising a predicate to the server.

At step 320, the server calculates the value of the encrypted Boolean predicate for each record in the table $\overline{T}$, in other words calculates the values $\overline{r}_i$, i=1, ... N.

At step 325, the index of the container is initialized, i.e. m=1.

At step 330, the server constructs a container $B_m$ comprising a predetermined number K of locations and blindly stores at these locations the records satisfying the predicate not previously transmitted to the user. The construction of the container is carried out as explained above in relation to FIG. 2.

At step 340, the server transmits to the user the container $B_m$.

At step 350, the user decrypts the content of each location of the container $B_m$, in other words, each element of the matrix $\overline{B}$.

At step 360, the user determines if a null row is present or not in the container $B_m$. It is thus deduced whether the container is full or not.

If such a row is detected, the user deduces therefrom that the user has received all records satisfying the query. Indeed, it will be understood that the last container $B_{\tilde{m}}$ comprises K-(M-$\tilde{m}$K) null rows whereas previous containers $B_m$, m=1, ..., $\tilde{m}$-1 do not contain any. The user obtains in 370 the response to the request R from the records stored in the containers $B_m$, m=1, ..., $\tilde{m}$, previously decrypted in step 350. The processing of the request ends in 375.

Conversely, if the user does not detect such a null row after decryption, it transmits to the server a continuation request $RC_m$ in 380 and increments the index of the container, m, in 385 before returning to step 330.

The invention claimed is:

1. A method for confidentially querying a database hosted by a server, the database contains a table of records, the method comprising:
  (a) a user transmits a request, comprising a predicate, to the server, the predicate being a logical expression involving one or more fields of the table of records, wherein each record is obtained by a totally or partially homomorphic encryption of plaintext values;
  (b) the server calculates an encrypted Boolean value of the predicate for each record in the table;
  (c) the server constructs a container comprising a predetermined number of locations and blindly stores to the locations of records verifying the predicate and not previously transmitted to the user, from the encrypted Boolean values obtained in (b);
  (d) the server transmits the container thus constructed to the user;
  (e) the user receives the container, decrypts the contents of each location, and determines whether or not the container is full;
  (f1) the user transmits, when the container is full, a continuation request to the server for a new iteration of (c), (d) and (e);
  (f2) the user obtains, when the container is not full, the response to the request from the records stored in the containers received and decrypted in (e).

2. The method for confidentially querying a database according to claim 1, wherein the table of records is represented by a matrix $\overline{T}$ with a size of N×P, wherein N is a number of records in the table and P a number of fields of the records, an encrypted element $\overline{A}$ of the matrix being obtained from plaintext value $$A = \sum_{q=0}^{Q-1} a_q 2^q$$

by $\overline{A} = \overline{a}_0, \overline{a}_1, \ldots, \overline{a}_{Q-1}$ wherein $a_q$, q=0, ..., Q-1 are bits of the plaintext value and $\overline{a}_q$, q=0, ..., Q-1 are their corresponding encrypted elements obtained by the totally or partially homomorphic encryption.

3. The method for confidential querying of a database according to claim 2, wherein the predicate is evaluated on different records by additive and multiplicative operations on the encrypted elements.

4. The method for confidential querying of a database according to claim 3, wherein the container is represented by a matrix $\overline{B}$ with a size of K×P with K<N, the server constructing the matrix $\overline{B}$ by initializing elements of the matrix to zero and by updating rows of the matrix iteratively by scanning all the records from the table of records, the updating being done by an assignment operation:

$$\overline{B} = Aff\_row(\overline{B}, \overline{c} \otimes \overline{t_i}; \overline{k})$$

affecting indiscriminately the vector $\overline{c} \otimes \overline{t_i}$ at the $k^{th}$ row of $\overline{B}$, wherein $\overline{t_i}$ is a row-vector of $T$ representing a $i^{th}$ scanned record and $\overline{c}$ is an encrypted Boolean element.

5. The method for confidential querying of a database according to claim 4, wherein the assigning a vector $\overline{u}$ of P encrypted element at the $k^{th}$ row of a matrix $\overline{H} = (\overline{h}_{ij})$ of encrypted elements with a size of K×P yielding a matrix $\overline{G} = (\overline{g}_{ij})$ of encrypted elements of same size such as Dec$(\overline{g}_{ij})$=Dec$(\overline{h}_{ij})$ $\forall i \neq k$ and Dec$(\overline{g}_{kj})$=Dec$(\overline{u}_j)$, $1 \leq j \leq P$.

6. The method for confidential querying of a database according to claim 4, wherein the encrypted Boolean element is calculated using $\overline{c} = \overline{r_i} \otimes (\overline{n_{last} < i_{dx}}) \otimes (\overline{i_{dx} \leq n_{last} + K})$ wherein $\overline{r_i}$ the encrypted boolean predicate for the $i^{th}$ scanned record, $\overline{i_{dx}}$ an encrypted variable giving the number of already scanned records satisfying the predicate, $n_{last} = (m-1)$ K wherein $m-1$ is the number of containers previously transmitted by the server to the user and $\overline{n_{last}}, \overline{n_{last} + K}$ the respective encrypted elements of $n_{last}$ and $n_{last} + K$.

7. The method for confidential querying of a database according to claim 6, wherein the encrypted variable $\overline{i_{dx}}$ is updated with each scanned record by $\overline{i_{dx}} = \overline{i_{dx}} + \overline{r_i}$.

8. The method for confidential querying of a database according to claim 6, wherein the encrypted index $\overline{k}$ of the row of the matrix $\overline{B}$ is updated with each scanned record by $\overline{k} = \overline{k} + \overline{c}$.

9. The method for confidential querying of a database according to claim 1, wherein the database is partitioned into portions with a size of N/L with the possible exception of a portion, (c), (d), (e), (f1)-(f2) being carried out in series or in parallel, on each of the base portions.

10. The method for confidential querying of a database according to claim 1, wherein the fully homomorphic encryption method uses a Brakerski cryptosystem.

* * * * *